Sept. 11, 1934.    J. W. McCULLOUGH ET AL    1,973,494
CONVERTIBLE MOTOR VEHICLE
Filed April 24, 1931    3 Sheets-Sheet 1

INVENTORS:
J. W. McCullough
F. Dormann
BY
ATTORNEYS.

Sept. 11, 1934.   J. W. McCULLOUGH ET AL   1,973,494
CONVERTIBLE MOTOR VEHICLE
Filed April 24, 1931   3 Sheets-Sheet 2
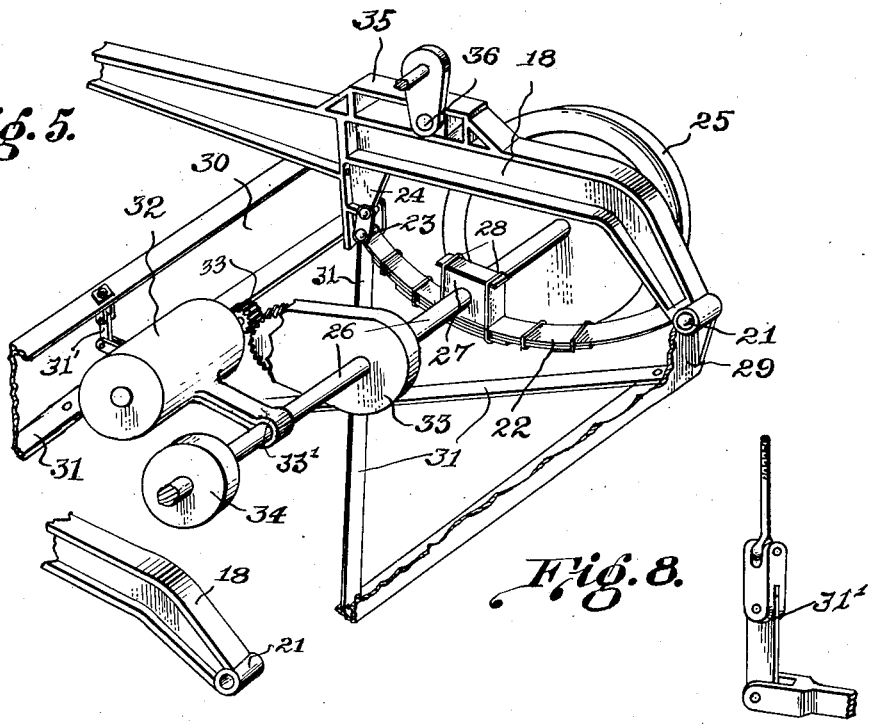
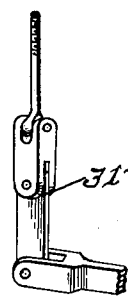
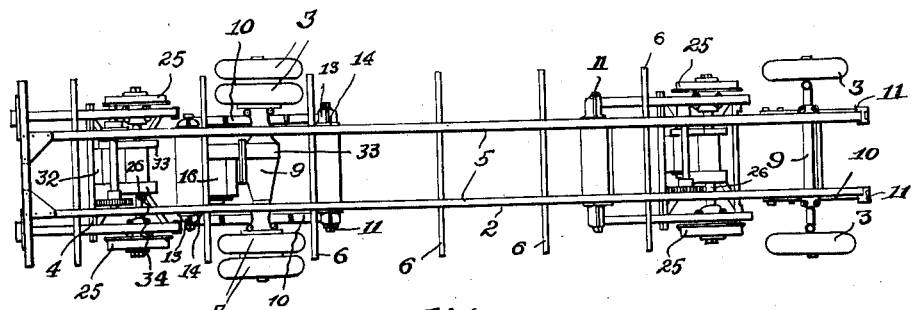
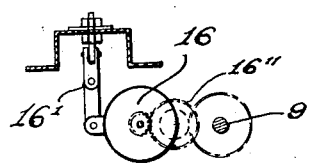
INVENTORS:
J. W. McCullough
and F. Dormann   BY: Marks & Clerk
ATTORNEYS.

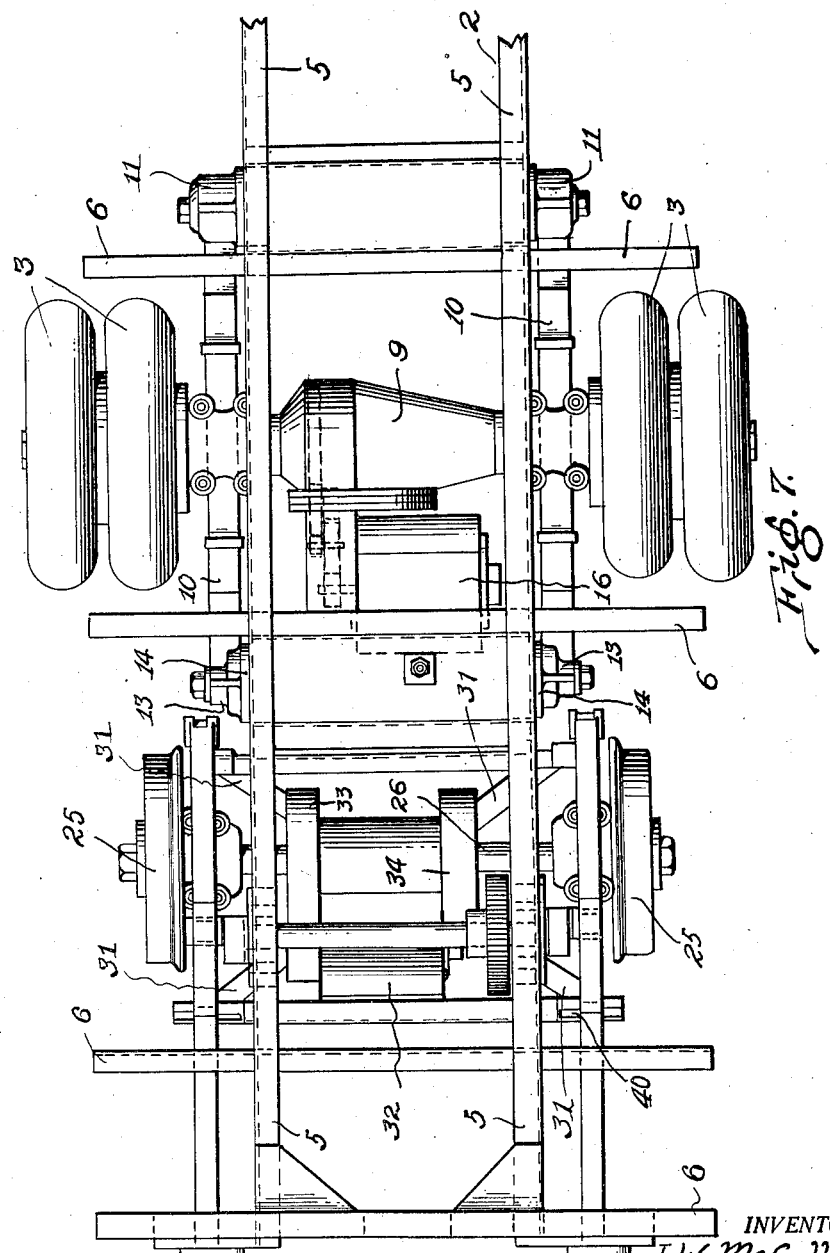

Patented Sept. 11, 1934

1,973,494

UNITED STATES PATENT OFFICE 1,973,494

CONVERTIBLE MOTOR VEHICLE

Jay W. McCullough and Fred Dormann, Denver, Colo.

Application April 24, 1931, Serial No. 532,661

8 Claims. (Cl. 105—215)

This invention has reference generally to improvements in motor vehicles and more particularly relates to a convertible motor vehicle for use on roads and railways.

It is the primary object of the invention to provide mechanism which will enable the use of an automobile truck, bus or trailer on a standard railway in addition to its use on an ordinary road or street.

More particularly the invention may be said to consist of the provision of separate truck wheel assembly units connected at both the front and rear parts of the frame of the automobile, truck or bus, each unit including a separate set of springs for supporting the track engaging wheels in a manner somewhat similar to the standard resilient supporting means for the pneumatic wheels of the vehicle in combination with mechanism for raising and lowering the wheel truck assembly units with respect to the track-bed.

A further object of the invention resides in the provision of the improved construction of crossheads and guides of the truck assembly units whereby an effective locking action is produced, any load applied to the vehicle being taken up by this improvement thus relieving the operating gear from strains incident to the heavy load.

Other objects as well as the nature, characteristic features and scope of the invention will be more readily apparent from the following description taken in connection with the accompanying drawings and pointed out in the claims forming a part of this specification.

The invention is clearly illustrated in the accompanying drawings in which:—

Fig. 1 is a side elevation of the motor truck operating as such with the truck assembly units in a raised position, Fig. 2 is a side elevation of the truck frame, the body being removed while the wheel truck assembly units are in a lowered position on rails of the track-bed so that the vehicle may travel thereon, Fig. 3 is an enlarged elevational detail of one of the wheel truck assembly units, the dotted lines indicating the position assumed by the parts when in a raised position, Fig. 4 is an enlarged cross sectional detail partly in elevation showing the connection of one of the wheel truck assembly units to the vehicle frame, Fig. 5 is a fragmentary perspective detail of one of the units, Fig. 6 is a plan detail of the chassis with the body removed, Fig. 7 is an enlarged plan detail of the rear portion of the chassis.

Fig. 8 is a perspective detail of the motor support of one of the units, and

Fig. 9 is an elevational detail partly in section showing one of the main motor supports.

Similar characters of reference are employed in all of the above described views to indicate corresponding parts.

Figure 1:
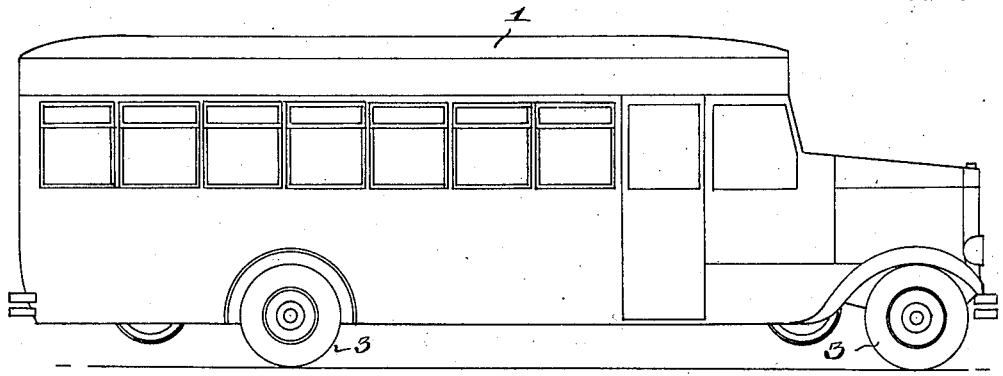

Referring now, more particularly, to the accompanying drawings there is provided a motor truck in the form of a bus including generally a bus body 1 of a conventional design supported on the improved frame 2 through the instrumentality of the front and rear pneumatic wheels 3. When in the position shown in Fig. 1 the device operates as a road vehicle while mounted on the frame near the front and rear ends thereof are improved wheel truck assembly units through the medium of which the bus can be easily and quickly converted into a light railway vehicle for operating on the track-bed 4.

The vehicle frame or chassis 2 preferably consists of side bars 5 of channel-shaped formation said side bars 5 being connected at suitable intervals throughout their length by means of similarly profiled cross-bars 6. The front and rear portions of the side bars 5 are raised as indicated at 7 and 8 while the front and rear pneumatic tire carrying wheels 3 have their axles 9 supported on spring units 10, the front portions of the latter being pivotally connected as at points 11 forwardly of the raised portions 7 and 8 of the side bars while the rear ends of the springs are connected by shackles 13 to other brackets 14 and suspended in turn from the under-surface of the raised portions 7 and 8 in the side bars.

A gas-electric power plant generally indicated by the numeral 15 is mounted on the front raised portion 7 of the frame 2 and through the instrumentality of suitable conducting wires (not shown) power is transmitted to a motor 16 suspended as at 16' from a cross bar of the frame 2 and loosely connected to the rear axle 9, the latter in turn transmitting power through a gear train 16" to the rear wheels 3 as shown in Fig. 9.

In order that the motor bus may be converted into a light railway vehicle improved wheel truck assembly units generally indicated by the numeral 17 are mounted beneath the raised portions 7 and 8 of the frame 2 in such manner as to be raised and lowered with respect thereto. Each unit consists of side arms 18 the rear ends of which are pivotally connected at 19 to brackets 20 secured respectively to the side bars of the frame rearwardly of the raised portions 7 and 8. The outer ends of the bars 18 are curved downwardly and have pivoted thereto as at 21 the forward ends of leaf springs 22 the rear ends of which are pivotally supported by shackles 23 in turn pivoted to bearings 24 depending from the arms 18. Flanged track engaging wheels 25 are now provided and are rigidly mounted on the respective ends of an axle 26 the latter being journalled in bearings 27 and clamped as at 28 to the upper medial portions of the springs 22 forming a resilient suspension for the wheels in the units 17. The opposed two bars of each unit are connected together by front and rear cross-bars 29 and 30. The lower ends of these bars are connected together by cross-braces 31. A motor 32 operable in a suitable manner from the gas-electric plant 15 is suspended by a link and shackle connection 31' from the rear cross bar 30 and transmits power through the gearing 33 to the corresponding axles 26. An arm 33' extends from the motor and is loose on the axle 26 to facilitate the supporting of the motor. A suitable braking device 34 is also supported on the frame associated with the rear axle 26.

Figure 2:
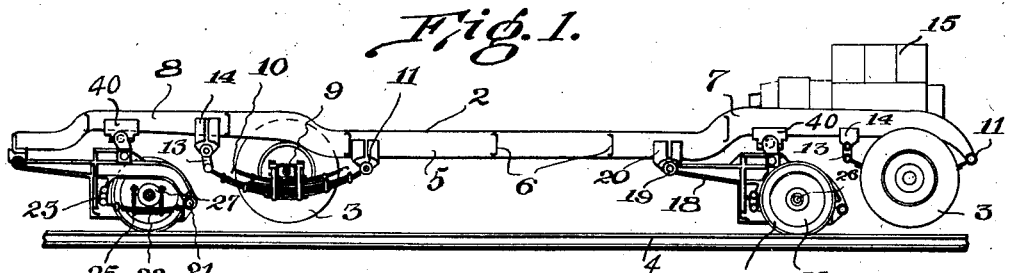
Figure 3:
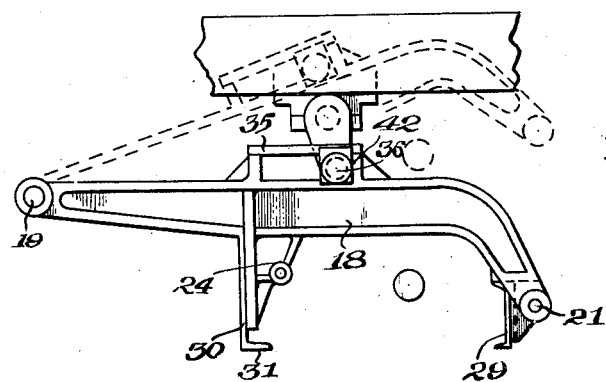
Figure 4:
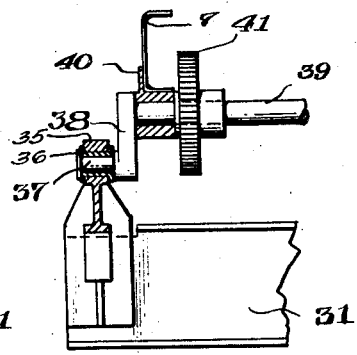

Cooperating with the track wheel assembly units and forming a part thereof is the improved means for raising and lowering the track engaging wheels into the desired position. In reducing this feature of the invention to practice a cross-head guide 35 is preferably cast integral with the top of each bar 18 and receives cross-head slides 36 rotatably mounted in turn on the pins 37 of crank arms 38. The inner ends of these crank arms 38 are connected to the projecting ends of the shafts 39 journalled in the brackets 40 mounted in turn on the undersurface of the raised portions 7 and 8 respectively. In order to rotate the shafts 39 gear wheels 41 are connected to the shafts and operated by motor or other suitable means. When in the position shown in Figs. 2 and 3 the wheels 25 rest on the rails of the track-bed 4, the units being held in this position by reason of the slightly forward inclination of the crank arms 38 the pins being positioned so that the cross-heads 36 abut the forward portions 42 of the cross-head guides 35 thus substantially locking the units in the lowered position. The load of the vehicle acts to hold the crank pin and the cross-heads against the portions 42 which arrangement incidentally relieves the shifting gear wheels 41 of any strain except when moving the units to a raised position at the time the device is being re-converted into a road vehicle. As shown in dotted lines in Fig. 3 the same portions 42 act to substantially hold or lock the truck wheel assembly units in the raised position.

From the foregoing it is believed apparent that by rotating the shafts 39 the wheel truck assembly units which are normally held about eight inches from the ground when the truck is supported by the road wheels 3 can be lowered on to the rails of the track-bed 4 and at the same time the truck frame and body with the pneumatic tired wheels lifted about three inches from the ground. Likewise by reversing the rotation of the shafts 39 the bus frame and body is lowered so that the wheels 3 engage the ground while the assembly units 17 are lifted or returned to their normal position of about eight inches from the ground.

Attention is directed to the fact that brackets 14 and 40 are so positioned on the undersurface of the raised portions 7 and 8 that sufficient clearance is left between brackets 14 and the front ends of the arms 18 of the units that the latter may be raised or moved to an elevated position when desired without interfering with the proper supporting of the ground wheels 3.

Attention is directed to the fact that the operating means for the units acts not only to raise and lower the units relative to the frame but to lock the units when the latter are in either a raised or lowered position. In other words the raising and lowering means includes a crank motion device embodying the shaft 39 and the arm 38, the pin 37, the cross head 36 and the cross head guide 35 for locking the arms rigidly with respect to the frame especially when in the lowered position.

Although no particular means has been illustrated for rotating the gear wheels obviously a shaft operable from one of the motors and provided with worms may be actuated to raise or lower the units or else a handle operated gear wheel provided with a ratchet arrangement may be associated with each gear wheel 41.

It is not believed that a further detailed description of the operation of the invention will be necessary. Likewise it is believed that the advantages of the invention will be readily apparent.

What is claimed as new is:

1. The combination with the wheeled supported frame of a motor vehicle, of truck units pivotally connected to the underside of the frame near the front and rear ends thereof, means for raising and lowering the units relative to the frame so as to convert the motor vehicle into a light railway car, said raising and lowering means including cross head guides on the opposite sides of the units, a shaft mounted for reversible rotary movement in the frame of the motor vehicle, crank pins on the outer ends of the shaft, and cross head slides rotatable on the heads and slidably engaged in the guides, the crank pins extending slightly forwardly of a vertical plane drawn through a longitudinal axis of the supporting shaft to position the cross head slides in engagement with the forward ends of the guides so as to substantially lock the units in either a raised or lowered position, thereby absorbing the weight of the vehicle frame especially when the units are in track engaging position.

2. The combination with the wheeled supported frame of a motor vehicle, of truck units pivotally connected to the underside of the frame near the front and rear ends thereof, means for raising and lowering the units relative to the frame so as to convert the frame into a light railway car, each of said units including a pair of side arms, the rear ends of which are pivotally supported to the frame, leaf springs, the forward ends of which are pivotally connected to the forward ends of the arms, an axle supported by the springs, and in turn carrying the flanged wheels and bearings depending from the side arms to which the rear ends of the springs are connected.

3. The combination with a wheeled supported frame of a motor vehicle, of truck units pivotally connected to the underside of the frame near the front and rear ends thereof, means for raising and lowering the units relative to the frame so as to convert the motor vehicle into a light railway car each of said means including side arms and downwardly curved forward ends, cross bars depending from the front and medial portions of the arms, cross braces connecting the lower ends of the cross bars, bearings depending from the arms, leaf springs operably connected at their respective ends in the bearings and in the forward ends of the arms, an axle carrying the flanged wheels, bearings supported on the springs for receiving the axle, a motor supported on the rear cross bar, gearing operatively arranged between the motor and the axle, substantially as and for the purpose set forth.

4. The combination with the wheeled supported frame of a motor vehicle, of truck units including arms pivotally connected to the frame, flanged wheels supported near the forward ends of the arms, and common means for quickly swinging the units into a raised or lowered position relative to the vehicle frame and for locking the units in either of the said positions, said means including parts partaking in the swinging movement of the units and coacting with each other to form a direct rigid connection between the arms and the vehicle frame when the arms are in a lowered position.

5. The combination with a wheeled supported frame of a motor vehicle, of truck units including arms connected to the frame, flanged wheels resiliently supported near the forward ends of the arms, operating means for said units including a crank motion device which in a lowered position extends downwardly and forwardly from the frame to the arm so as to directly and rigidly connect the frame to the arms in a manner to absorb strain imparted to the operating means, said crank motion device also acting to lock the arms against movement when in either a raised or lowered position.

6. In a convertible vehicle the combination, a main frame including side members, raised portions provided adjacent the front and rear ends of the side members, pneumatic tire carrying wheels resiliently connected to and positioned beneath the raised portions, truck units including interconnected side arms having their inner ends pivotally connected to the side members, flanged wheels resiliently connected to and supported by the outer ends of the arms, and means positioned between the arms and the raised portions for raising and lowering the units relative to the frame whereby when the units are in a raised position the flanged wheels will be supported within the raised portions.

7. An arrangement as claimed in claim 4, wherein the raising and lowering means include cross head guides on the arms, a shaft mounted for reversible rotary movement in the frame of the motor vehicle, crank pins on the outer ends of the shaft, and cross head slides rotatable on the heads and slidably engaged in the guides.

8. The combination with a wheeled supported frame, of truck units including arms swingably connected for vertical movement to the underside of the frame, wheels mounted near the forward ends of the arms, common means for quickly swinging the units into a raised or lowered position relative to the vehicle frame and for locking the units in either of the said positions, said means including parts partaking in the swinging movement of the units and coacting with each other to form a direct rigid connection between the arms and the vehicle frame when the arms are in a lowered position.

JAY W. McCULLOUGH.
FRED DORMANN.